3,236,923
GRAFT POLYMERIZATION OF AN ORGANO-SILOXANE COATING ON LEATHER BY IONIZING RADIATION

Edward F. Degering, Natick, Mass., assignor to the United States of America as represented by the Secretary of the Army
No Drawing. Original application Mar. 23, 1960, Ser. No. 17,228. Divided and this application Nov. 8, 1962, Ser. No. 242,344
2 Claims. (Cl. 264—22)
(Granted under Title 35, U.S. Code (1952), sec. 266)

The invention described herein, if patented, may be manufactured and used by or for the Government for governmental purposes, without the payment to me of any royalty thereon.

This application is a division of my copending application Serial No. 17,228, filed March 23, 1960, for "Graft Polymerization by Ionizing Radiation" now abandoned.

This invention relates to grafting of polymers on flexible organic base by low dosage ionizing irradiation, and more particularly to the production of polymeric coatings of the vinyl or silicone type on flexible cellulosic, keratinous, or plastics base by exposure to ionizing radiation at controlled low dosages of ionizing irradiation.

In accordance with the instant invention, it is possible to effect graft polymerization by repeated exposures to controlled small doses of ionizing radiation, at a substantially lower total dose than would be needed to effect the same degree of graft polymerization by continuous exposure to ionizing radiation, at the same or higher dose rates. That is, I have found quite unexpectedly that 20 exposures at 0.001 megarad per second, with a time-heating interval of ½ minute to about 1 hour between exposures, depending on the monomer system, yields much more polymerization, and consequently less degradation, than does a continuous exposure of 0.001 megarad per second for 20 seconds.

It has been found in the course of research on the effects of ionizing radiation that exposure to ionizing radiation of cellulosic, keratinous and plastics bases above certain dose rates causes them to deteriorate, with resultant loss in strength. The limit of permissible single dose rates varies depending on the material; thus, I have found that cellulosic material such as dry cotton and dry paper can withstand a single dose of about .1 megarad of ionizing irradiation without apparent deteriorative effect; leather can similarly withstand a single dose of about 2 megarads of ionizing irradiation without suffering detectable degradation. The term "megarad" as used herein, refers to a dose of ionizing radiation which produces an energy absorption of $100 \times 10^6$ ergs per gram of irradiated substance. The term "megarad" has now replaced the term "megarep" which latter term represents the quantity of ionizing radiation which produces energy absorption of $83 \times 10^6$ ergs per gram of tissue; thus, 1 megarep=.83 megarad, or 1 megarad=1.2 megareps (approx.).

It is not possible to polymerize most monomeric vinyl compounds by ionizing irradiation at a single dosage of .1 megarad, which is the approximate limit to which a cellulosic base can be safely exposed at a single exposure. In the case of leather, no satisfactory bonding between silicone resin coating and leather base can be effected by exposure to a single dosage of about 2 megarads, which is the safe dosage limit for a leather base.

Analogous observations were made in the course of attempts to apply a coating to a synthetic plastics base, such as nylon, by ionizing irradiation of the coating.

I have now discovered that the foregoing disadvantages can be overcome by exposure of the coated base to a plurality of dosages below the safe limit for the particular base, provided that the successive exposures are separated by intervals permitting at least partial completion of the chain reactions initiated by the ionizing irradiation. In the case of a cotton base, from 5 to 40 individual exposures at 0.001 to .1 megarad each, have enabled me to produce a highly satisfactory vinyl-type coating, without detectable injury to the base. Evidently, the effects of the repeated exposures to ionizing radiation are cumulative or nearly cumulative upon the vinyl coating, while the deleterious effects on the base are either obscured by the grafting process and/or essentially non-cumulative.

Similarly, I have produced strongly adherent silicone coatings on leather by repeated exposure of the coated leather to dosages of ionizing radiation at a dosage rate of not more than 2 megarads per exposure, preferably about 1.66 megarads per exposure. At predetermined intervals between successive exposures even as many as 10 passes were found to be substantially non-injurious to the leather,, and strongly adherent silicone coatings were formed after 4 or more passes, the optimum being about 7 to 8 passes.

Among bases that can be coated in accordance with my invention are cellulosic bases such as cotton or paper; keratinous bases, such as leather, wool, or feathers, and plastics bases in the form of woven textiles or self-supporting film sheets, e.g., nylon, cellulosic acetate, Acrilan (a mixed polymer of about 85% acrylonitrile and 15% vinyl derivatives), Dacron (ethylene glycol and terephthalic acid polyesters), Dynel (vinyl chloride and acrylonitrile copolymer), Mylar (polyethylene terephthalate), Orlon (polyacrylonitrile), polyethylene, Teflon (polymerized perfluoroethylene, Kel-F( polymeric chlorotrifluoroethylene).

The foregoing bases are of a polymeric nature, i.e., cellulose can be represented as a polymeric anhydride of dextrose; a keratin is a natural amino acid polymer, and a plastics surface of the nylon type is a synthetic polyamide polymer. My studies have shown that the ionizing radiation of such a base, coated with polymerizable vinyl-type or silicone coating, produces a grafting of the coating material onto the polymeric base, which accounts for the strength of the adhesion of the irradiated polymerized coating.

Among other suitable polymerizable vinyl type compounds for the practice of my invention are e.g., acrylonitrile, methyl acrylate, ethyl acrylate, propyl acrylate, butyl acrylate, heptyl acrylate, fluorinated propyl acrylate, fluorinated heptyl acrylate, allyl acrylate, vinyl acrylate, methyl methacrylate, ethyl methacrylate, styrene, vinyl toluene, vinyl acetate, isoprene, triallyl phosphate, vinyl triethoxy siloxane.

Other suitable silicones beside vinyl triethoxy siloxane are those disclosed in Patents Nos. 2,258,218 to 2,258,222, Rochow, assigned to General Electric Co.; still other suitable silicones characterized by organo-substituted polyfunctional repeating SiO units are produced by Dow Corning Corp., e.g., the "Silastic" series.

Moderate heating to a point non-injurious to the base, say to about 40°–85° C. assists in the formation of the graft polymer and enables a reduction of the total dosage of ionizing radiation. Exclusion of atmospheric oxygen during and between exposures to ionizing radiation, either by means of a vacuum, or by substitution of an inert atmosphere, e.g., $CO_2$, nitrogen, argon or helium has a very beneficial effect on the graft polymer formation, and may be combined with the moderate heating.

Polymerization promoters, such as acrylic acid or methacrylic acid, are useful in assisting the formation of a vinyl-type graft polymer by low dosage ionizing irradiation in accordance with the present invention.

The interval between successive exposures to ionizing radiation may be as short as ½ minute, and is preferably between about 15 minutes and about 1 hour. Generally, the longer the interval, the greater is the amount of graft polymerization obtained per unit of irradiation energy. However, if the intervals are too long, the manufacturing time of the coating process tends to become more expensive, unless a continuous cycle of the material being processed is maintained.

The individual passes (exposures) are rather short, e.g., ½ to about 4 seconds, preferably about 4 seconds per pass.

An effective source of ionizing radiation is a high energy electron accelerator of the Van de Graaff type. A commercially available model has a 2,000,000 electron volt (2 mev.) capacity; smaller competing electron accelerators now on the market have about 100,000 electron volt capacity. Another suitable source of ionizing radiation for the purposes of the present invention is gamma irradiation, e.g., from $Co^{60}$.

*Example I*

Cotton duck was coated with a 1:1 mixture of monomeric acrylonitrile and butyl acrylate, and subjected to ionizing irradiation at a dosage of .1 megarad per pass, with intervals of 1 hour between passes. During each interval, a 75° C. controlled temperature was applied. The amount of graft polymer deposited on the cotton base was measured in percentage of added weight (add-on). The following table illustrates the results obtained in the presence and absence of atmospheric air:

| | Percent add-on in— | | | |
|---|---|---|---|---|
| | Vacuum | Argon | Nitrogen | Air |
| Control (no irradiation) 40 hrs., 75° C | 3.6 | 0.3 | 0.4 | 0.4 |
| 5 passes at .1 megarad, 75° C | 7.0 | 4.0 | 3.7 | 0.5 |
| 20 passes at .1 megarad, 75° C | 27.5 | 27.0 | 26.7 | 7.1 |
| 40 passes at .1 megarad, 75° C | 48.0 | 52.0 | 55.6 | 36.2 |

All samples were post-heated after each pass under the beam. The tensile strength of the treated coated cotton was in each case about the same as the untreated coated cotton.

*Example II*

Example I was repeated on cotton duck with monomeric vinyl acrylate and a $CO_2$ inert atmosphere. The following results were obtained:

Percent add-on
10 passes at .001 megarad _____ 1.6
10 passes at .005 megarad _____ 7.3
10 passes at .025 megarad _____ 21.8
10 passes at .05 megarad _____ 25.6
10 passes at .1 megarad _____ 26.8

Similar coatings were formed on nylon cloth, wool cloth, and mixed wool-nylon fabric.

*Example III*

Kraft paper was coated with monomeric butyl acrylate and subjected to 6 passes at .06 megarad each under the same temperature conditions and with the same intervals between exposures to ionizing radiation as in Example I. An add-on of 130% was obtained. With styrene, the add-on on the kraft paper was 39%. The amount of add-on was determined by repeated extractions with methyl ethyl ketone which removed all coating that was not chemically bound to the paper base by graft polymerization.

*Example IV*

40 parts of ground chrome-tanned leather were impregnated by milling with 60 parts of Dow Corning Silastic organosiloxane ("Silastic 5303"), pressed into sheets at 1000 p.s.i., and irradiated at room temperature at 1.66 megarads (2 megareps) per pass, with 15 minutes interval between passes. The sheet material becomes increasingly stronger after the 4th pass, and tensile strength is at an optimum after 7 to 8 passes. No further improvement was noted after the 9th and 10th pass.

The coatings can be formed on one or both sides of the flexible sheet base (cotton, paper, fabric, etc.).

Having thus described several examples of the formation of graft polymer coatings by repeated exposure to ionizing radiation at controlled low dosages which are individually non-injurious to the base but sufficient in the aggregate to form the desired graft polymers, I now define the scope of my invention by the appended claims.

I claim:
1. Method of converting comminuted leather into sheet material by chemically grafting an organosiloxane polymer onto the leather comprising
   impregnating said comminuted leather with a polymerizable organosiloxane,
   pressing said impregnated comminuted leather into sheet form,
   exposing it to high intensity ionizing radiation equivalent to at least about 100,000 electron volts,
   at a dosage of not more than about 2 megarads per pass,
   said dosage being less than the dosage needed for completely polymerizing said organosiloxane,
   and repeating said exposure until said organosiloxane has polymerized and is chemically grafted on said leather as the result of repeated exposures,
   the intervals between successive exposures being at least about 15 minutes each.

2. A leather sheet produced from organosiloxane-impregnated comminuted leather by compression and high energy ionizing irradiation grafting according to the method of claim 1.

References Cited by the Examiner

UNITED STATES PATENTS

| 2,983,657 | 5/1961 | Gabelly et al. | 204—154 |
| 2,999,056 | 9/1961 | Tanner | 204—154 |
| 3,001,922 | 9/1961 | Zinim | 204—154 |
| 3,101,276 | 8/1963 | Hendricks | 204—154 |

FOREIGN PATENTS 810,310  3/1959  Great Britain.

MURRAY TILLMAN, *Primary Examiner.*
WILBUR L. BASCOMB, *Assistant Examiner.*